United States Patent [19]

Ebina

[11] Patent Number: 4,796,485
[45] Date of Patent: Jan. 10, 1989

[54] REMOTE CONTROL APPARATUS FOR TRANSMISSION

[75] Inventor: Akimitsu Ebina, Saitama, Japan

[73] Assignee: Jidosha Kiki Co., Ltd., Tokyo, Japan

[21] Appl. No.: 782,496

[22] Filed: Sep. 30, 1985

[30] Foreign Application Priority Data

Oct. 25, 1984 [JP] Japan ................................. 59-223014

[51] Int. Cl.⁴ ........................................... B60K 41/06
[52] U.S. Cl. ........................................ 74/866; 74/335
[58] Field of Search ................. 74/335, 879, 866, 364; 364/424.1

[56] References Cited

U.S. PATENT DOCUMENTS

| 3,662,625 | 5/1972 | Wakamatsu et al. | 74/866 |
| 3,703,109 | 11/1972 | Irie et al. | 74/866 |
| 3,710,651 | 1/1973 | Marumo et al. | 74/866 |
| 3,750,495 | 8/1973 | Ito et al. | 74/866 |
| 4,224,842 | 9/1980 | Rabus et al. | 74/866 |
| 4,291,586 | 9/1981 | Buetemeister | 74/335 |
| 4,474,082 | 10/1984 | Spokas et al. | 74/866 |
| 4,520,694 | 6/1985 | Eschrich et al. | 74/866 |

FOREIGN PATENT DOCUMENTS

0103066 6/1984 Japan ................................. 74/335

Primary Examiner—Leslie A. Braun
Assistant Examiner—Dwight G. Diehl
Attorney, Agent, or Firm—Blakely, Sokoloff, Taylor & Zafman

[57] ABSTRACT

In a remote control apparatus for a transmission, a gear change of a transmission is performed by auxiliary power, the auxiliary power is controlled upon change lever operation by a driver and, in case that the present selected position of the gear is different from the selecting position instructed by the change lever, the gear of the transmission is held in a neutral position for a predetermined period of time when the gear is moved from any shift position to the neutral position.

4 Claims, 5 Drawing Sheets

REMOTE CONTROL APPARATUS FOR TRANSMISSION

BACKGROUND OF THE INVENTION

The present invention relates to a remote control apparatus for a transmission which performs remote control operation of a transmission by utilizing auxiliary power.

Large-sized buses have been developed in recent years, and engines are mounted in rear body portions in such buses. Along with this change in mounting position of the engine, a transmission or gear box is also mounted in the rear body portion. In a conventional transmission control mechanism, when a driver operates a change lever, an operation force is transmitted to the transmission mounted in the rear body portion through a link mechanism.

Operation of such a conventional transmission system requires a large force. In order to decrease the operation force, auxiliary power utilizing compressed air has been recently used to shift the transmission position. The auxiliary power is controlled upon operation of the change lever. In this manner, light gear transmission like in normal passenger cars can be performed even in heavy-duty vehicles such as buses. When the auxiliary power is used for gear transmission, the gear shift can be smoothly performed, and a large operation force can be easily produced. Therefore, the gear shift time can be shortened.

Figure 1A:
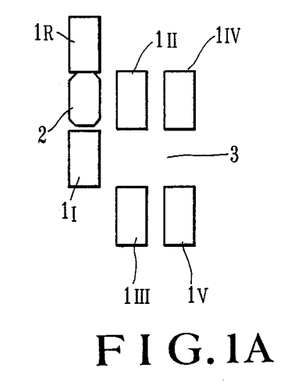
FIGS. 1A to 1E are respectively diagrams for explaining the operation of a transmission of the related art.
Figure 1B:
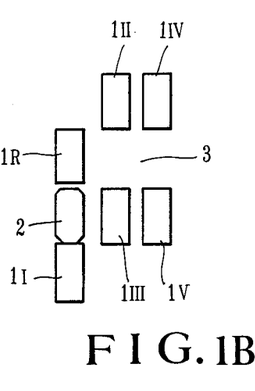

FIGS. 1A to 1E are respectively diagrams for explaining the operation of the transmission in the related art. Referring to FIGS. 1A to 1E, reference numerals 1R and 1I denote reverse and first-speed gear shift jaws; 1II and 1III, second- and third-speed gear shift jaws; 1IV and 1V, fourth- and fifth-speed gear shift jaws; and 2, a striker of a gear shift unit for performing shift and selection (to be described later) in synchronism with movement of a change lever. Among these shift jaws, the shift jaws 1R and 1I are formed integrally with a gear shift fork 4, as shown in FIG. 2. The shift jaws 1R and 1I and the gear shift fork 4 are fixed on a shift rail 5. When the striker 2 is inserted in a groove 3 and is axially moved along the shift rail 5, the shift jaws 1R and 1I engaged with the striker 2 are axially moved along the shift rail 5. This movement is referred to as a shift hereinafter, and the moving direction is referred to as a shift direction. When the shift jaws 1R and 1I are shifted, the shift fork 4 integrally formed with the shift jaws 1R and 1I is shifted along the shift direction. A gear (not shown) engaged with the shift fork 4 is shifted along the shift direction, so that the transmission is set in the reverse or first-speed gear position. In other words, when the striker 2 is shifted to the left in FIG. 2, the reverse position state shown in FIG. 1A is set. However, when the striker 2 is shifted to the right in FIG. 2, the first-speed gear position state is obtained, as shown in FIG. 1B.

The structure of other shift jaws, i.e., the shift jaws 1II and 1III or the shift jaws 1IV and 1V is the same as the shift jaws 1R and 1I formed to define the groove 3 there between. When the striker 2 is inserted in the groove 3 defined by the shift jaws 1II and 1III or the shift jaws 1IV and 1V and is shifted along the shift direction, the corresponding shift jaws are also shifted accordingly.

As shown in FIG. 2, the shift jaws are aligned along the shift rail 5. When the striker 2 is inserted in the groove 3 and is shifted along the shift direction, the striker 2 is brought into contact with one of the two shift jaws. However, when the striker 2 is moved along a direction away from the groove 3 and perpendicular to the axial direction of the shift rail 5, the striker 2 can be disengaged from the groove 3. Movement of the striker 2 along a direction perpendicular to the axial direction of the shift rail 5 is defined as selection and its direction is defined as a "select direction".

Figure 1C:
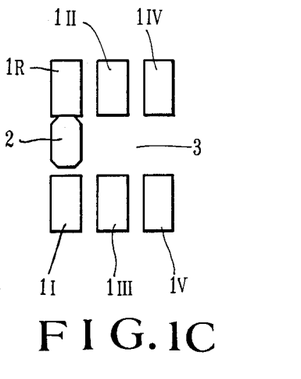

Three pairs of shift jaws are arranged adjacent to each other, as shown in FIGS. 1A to 1E. When the shift state shown in FIG. 1A or 1B is given, the striker 2 cannot be removed from the groove 3 defined by the shift jaws 1R and 1I due to the presence of the jaw 1II or 1III. However, when the change lever is set in the neutral position, the striker 2 is located at the position shown in FIG. 1C. The striker 2 can be inserted in the groove 3 of the adjacent pair of shift jaws 1II and 1III. In the state of FIG. 1C, selection can be performed along the right select direction. When the striker 2 is inserted in the groove 3 defined by other shift jaws and is shifted, the gear shift corresponding to the groove 3 is performed.

The gear shift is performed in synchronism with movement of the change lever upon shifting of the striker 2 along a given shift direction. When the striker 2 returns from a shift position to the neutral position, it is moved along a given select direction and is shifted along any shift direction, thereby completing the gear change. Since the striker 2 is shifted and selected by the auxiliary power of compressed air, the force required for movement of the change lever is minimized.

Figure 1D:
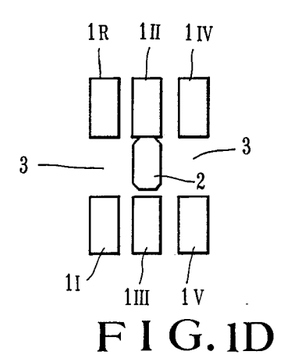
Figure 1E:
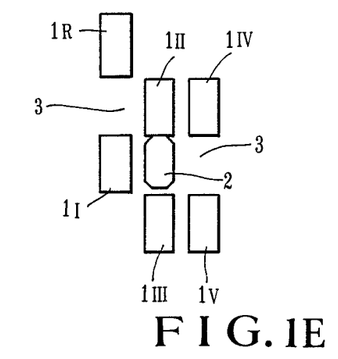
Figure 2:
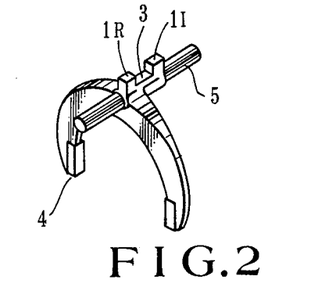
FIG. 2 is a perspective view for explaining shift jaws of the related art.

For example, when the gear shift is performed from the first-speed gear position to the second-speed gear position, the striker 2 is shifted from the state of FIG. 1B to the state of FIG. 1C. The striker 2 performs selection, as shown in FIG. 1D. Thereafter, the second-speed gear position is set. The above operation sequence is very short since the auxiliary power is utilized. The shift jaws 1R and 1I are formed integrally with the shift fork 4 having a larger mass than those and the reverse and first-speed gears (not shown) engaged with the shift fork 4, as shown in FIG. 2. When the shift jaws 1R and 1I, the shift fork 4 and the reverse and first-speed gears are shifted as a mass from the state of FIG. 1B to the state of FIG. 1C at a high speed, a larger inertia force is generated. When the mass reaches the state of FIG. 1C, the striker 2 is immediately moved in the select position. In this case, since the inertia force of the mass including the shift jaws 1R and 1I is sufficiently left, the shift jaws 1R and 1I cannot be stopped in the state of FIG. 1D and overshoot. As a result, the state of FIG. 1E is given before the striker 2 is shifted, and the reverse state is obtained.

When the reverse state is obtained, the striker 2 abuts against the shift jaw 1I and can no longer be inserted in the groove 3 defined by the shift jaws 1R and 1I. The transmission is locked in the reverse state. Since the shift rail 5 has a double gear engagement prevention unit (not shown), second- or third-speed gear shift cannot be performed.

Since the reverse and first-speed gears do not have a synchromesh arrangement, the transmission tends to be locked in the reverse state. However, the same phenomenon occurs even in other speed gears.

Figure 3:
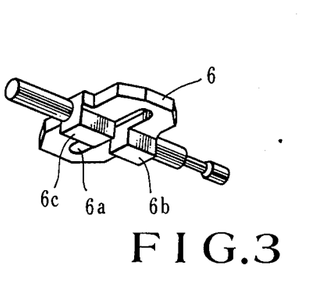
FIG. 3 is a perspective view of an interlock plate of the related art.

In order to prevent this phenomenon, an interlock plate 6 is proposed, as shown in FIG. 3. The interlock plate 6 has a groove 6a and projections 6b and 6c formed at two sides of the groove 6a. When the striker 2 is inserted in the groove 6a and is moved in the select direction, the interlock plate 6 is also moved along the same select direction. The projection 6b or 6c is fitted in the groove 3 of the selected shift jaw, thereby preventing overshooting of the shift jaw.

In order to absorb the large inertia force, the interlock plate in the groove 6a and is moved in the select direction, the interlock plate 6 is also moved along the same select direction. The projection 6b or 6c is fitted in the groove 3 of the selected shift jaw, thereby preventing overshooting of the shift jaw.

In order to absorb the large inertia force, the interlock plate 6 must have enough rigidity and becomes high cost, and mounting and adjustment thereof is time-consuming, thus increasing the cost of the transmission.

SUMMARY OF THE INVENTION

It is, therefore, an object of the present invention to provide a remote control apparatus of a transmission, wherein in a situation wherein the present selected position of the gear is different from the selecting position instructed by the change lever, a neutral position is kept for a predetermined period of time to absorb an inertia of the gear when a striker reaches the neutral position from the shift position, thereby eliminating the conventional drawbacks.

In order to achieve the above object of the present invention, there is provided a remote control apparatus for a transmission, which has a selection path, a plurality of shift paths disposed parallel with each other and intersecting with the selection path respectively, neutral positions each of which are disposed at an intersection of the selection path and each of the plurality of shift paths, and a shift position disposed at both ends of each of the shift paths, a gear which changes its position from one to another of the shift positions through at least one of the shift paths and at least one of the neutral positions, comprising: means for sending a signal representing an operation state of a change lever; auxiliary power means, remote-controlled by the change lever, for changing the position of the gear of the transmission and sending a signal representing the position of the gear; and control means for controlling an operation of the auxiliary power means in accordance with the change lever operation state signal and gear position signal. The control means being provided with neutral position holding means, which, when the gear is transferred from any one of the shift positions to another one which exists on a shift path other than the shift path on which the one shift position exists, holds the gear in the neutral position on the same shift path as said one shift position for a predetermined period.

DETAILED DESCRIPTION OF THE PREFERRED EMBODIMENT

A remote control apparatus for a transmission according to an embodiment of the present invention will be described with reference to the accompanying drawings.

Figure 4:
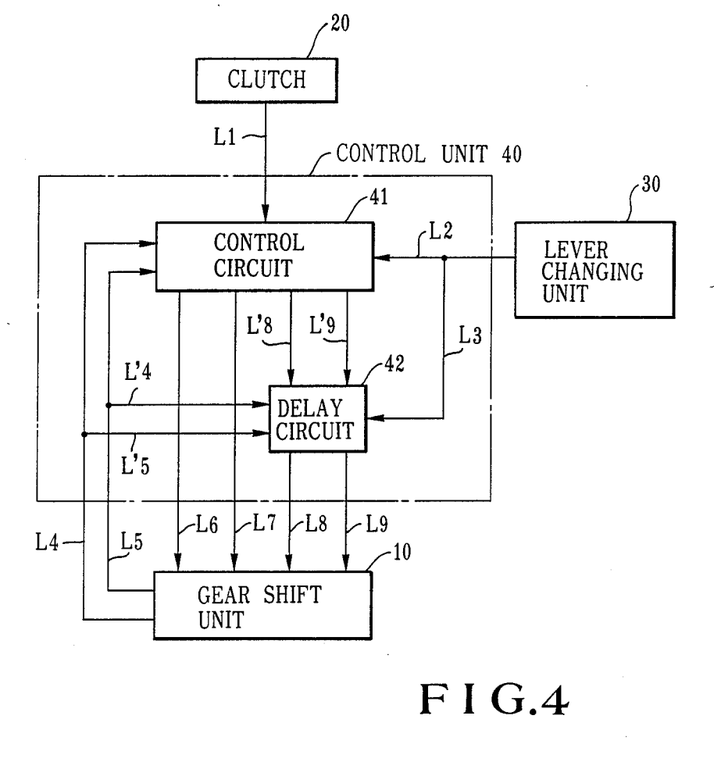
FIG. 4 is a block diagram of a remote control apparatus for a transmission according to an embodiment of the present invention.

FIG. 4 shows a schematic structure of a remote control apparatus for a transmission according to the embodiment of the present invention. Referring to FIG. 4, reference numeral 10 denotes a gear shift unit located at the rear body portion to perform gear shift; 20, a clutch; 30, a lever changing unit for allowing a driver to change the gear position; and 40, a control unit for generating a gear shift control signal in accordance with the signals supplied from the clutch 20, the lever changing unit 30 and the gear shift unit 10. The control unit 40 comprises a control circuit 41 and a delay circuit 42. The clutch 20 is connected to the control circuit 41 through a line L1, so that a clutch operation signal is supplied to the control circuit 41 through the line L1. The lever changing unit 30, the control circuit 41 and the delay circuit 42 are interconnected through lines L2 and L3, and a driver's lever changing signal is supplied to the control circuit 41 and the delay circuit 42 through the lines L2 and L3. The gear shift unit 10 is connected to the control circuit 41 through lines L4, L5, L6 and L7. The gear shift unit 10 is connected to the delay circuit 42 through lines L8 and L9. The lines L4 and L5 in the interior of the control unit 40 are connected to the delay circuit 42. The control circuit 41 is connected to the delay circuit 42 through lines L8' and L9'. A signal associated with the correct shift position of the gear is supplied from the gear unit 10 to the control circuit 41 and the delay circuit 42 through the lines L4 and L4'. A signal associated with the current select position of the gear is supplied from the gear shift unit 10 to the control circuit 41 and the delay circuit 42 through the lines L5 and L5'. A command signal associated with the shift and shift position of the gear is supplied from the control circuit 41 to the gear shift unit 10 through the lines L6 and L7. A command signal associated with the selection and the select position is supplied from the control circuit 41 to the delay circuit 42 through the lines L8' and L9'.

The contents of the command signal received through the lines L8' and L9' are transferred from the delay circuit 42 to the gear shift unit 10 through the lines L8 and L9 when a predetermined period of time has elapsed under a condition described later. The gear shift unit 10 performs shift and selection in accordance with the signal associated with the shift of the gear supplied from the control unit 40 through the lines L6 and L7 and the signal associated with the selection of the gear supplied through the lines L8 and L9.

Figure 5:
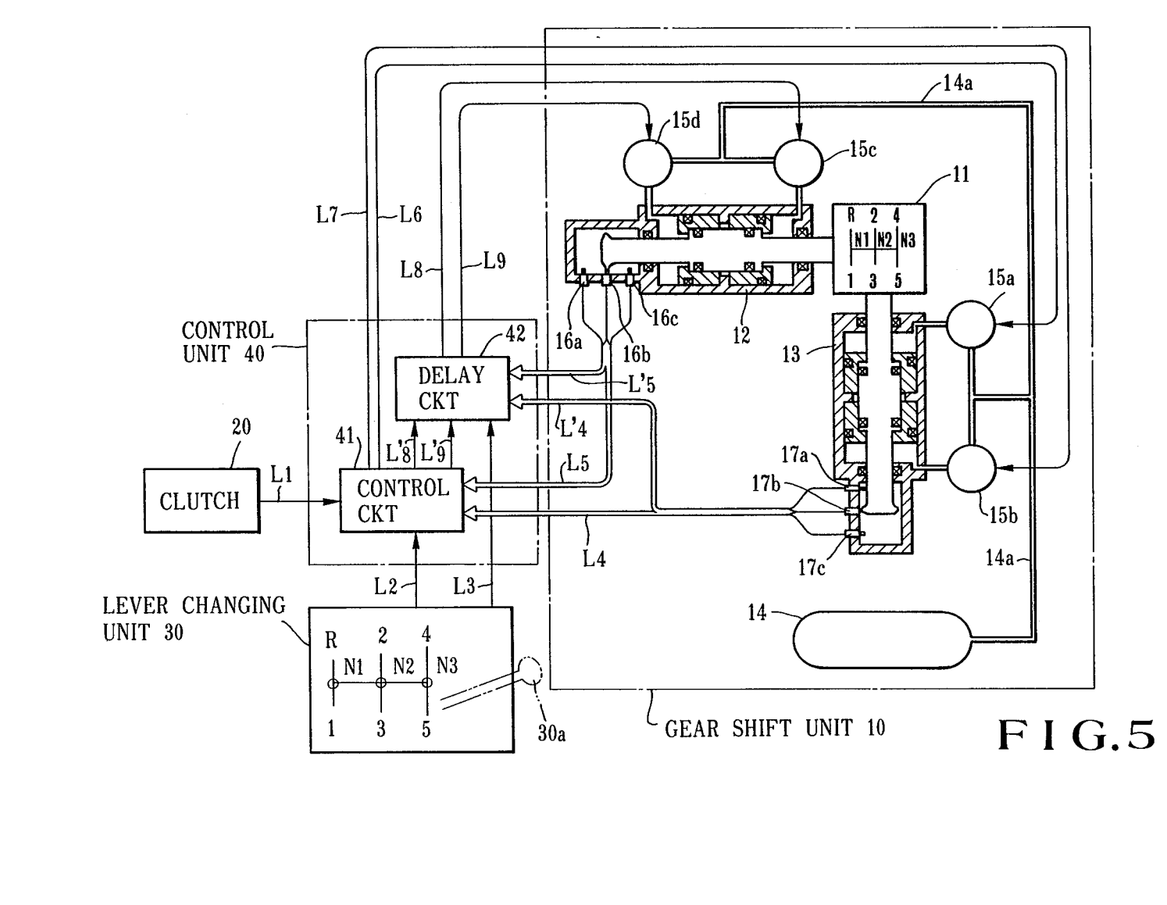
FIG. 5 is a block diagram showing the detailed arrangement of a gear shift unit in the apparatus of FIG. 4.

FIG. 5 is a detailed diagram of the gear shift unit 10 in the apparatus of FIG. 4. Referring to FIG. 5, reference numeral 11 denotes a transmission; 12, a selected unit for driving the transmission 11 in the select direction; 13, a shift unit for driving the transmission 11 in the shift direction; 14, an air reservoir for supplying compressed air to the select and shift units 12 and 13; and 14a, an air conduit. Each of the select and shift units 12 and 13 has a cylinder, a piston reciprocally moved at the central portion of the cylinder, a piston rod coupled to the piston and extending from the two ends of the cylinder, and air intake ports formed at the two ends of the cylinder. Each air intake port is connected to the air conduit 14a through magnet valves 15a, 15b, 15c and 15d for opening/closing the air path in response to an electrical signal. One end of each of the piston rods of the select and shift units 12 and 13 is connected to the striker 2 of the transmission 11. When the piston rods of the units 12 and 13 are moved, the shift and the selection of the gear are performed.

The magnet valves 15a and 15b connected to both the air intake ports to define an air path open/close the air path in response to the signals supplied from the control unit 40 through the lines L6 and L7. The piston is driven by the compressed air supplied from the air intake ports, and the piston rod drives the transmission, thereby performing the shift.

In the select unit 12, the magnet valves 15c and 15d receive the control signals supplied from the control unit 40 through the lines L8 and L9 and perform the selection in the same manner as in the shift.

In other words, the transmission 11 and the lever changing unit 30 have the same shift pattern in that one selection path along the select direction and three parallel shift paths along the shift direction intersect with each other, three neutral positions are disposed at the intersection of the selection path and the three shift paths, and the shift positions 1, R, 2, 3, 4 and 5 are disposed at both ends of each shift path. The three shift paths constitute three "select positions" of the change lever in the lever changing unit 30 and the striker at transmission 11, respectively. The striker must pass the selection path when it moves from one select position to another select position.

The ends of the select and shift units 12 and 13 which are located opposite to the transmission 11 constitute position sensors, respectively. Each position sensor has a switch which is turned on/off by a hook mounted at the distal end of the piston rod. Switches 16a, 16b and 16c in the select unit 12 are turned on at three select positions, respectively. The current select position signal is supplied to the control circuit 41 through the line L5 and to the delay circuit 42 through the line L5'. A switch 17a in the shift unit 13 is turned on when a reverse, second-speed or fourth-speed gear position is set. A switch 17b in the unit 13 is turned on when the neutral state is set. A switch 17c in the unit 13 is turned on when the first-, third- or fifth-speed gear position state is set. A current shift position signal from the switch 17a, 17b or 17c is supplied to the control circuit 41 through the line L4 and to the delay circuit 42 through the line L4'. For example, in the state shown in FIG. 5, the transmission 11 is set at the middle select position and at the same time at the neutral position, and the switches 16b and 17b are turned on. In this state, when the magnet valve 15a is turned on, the piston rod of the shift unit 13 is moved downward in FIG. 5. The switch 17b is turned off, and then the switch 17c is turned on.

Referring to FIG. 5, when the driver moves a change lever 30a, the lever changing unit 30 supplies the corresponding signal to the control circuit 41.

Figure 6:
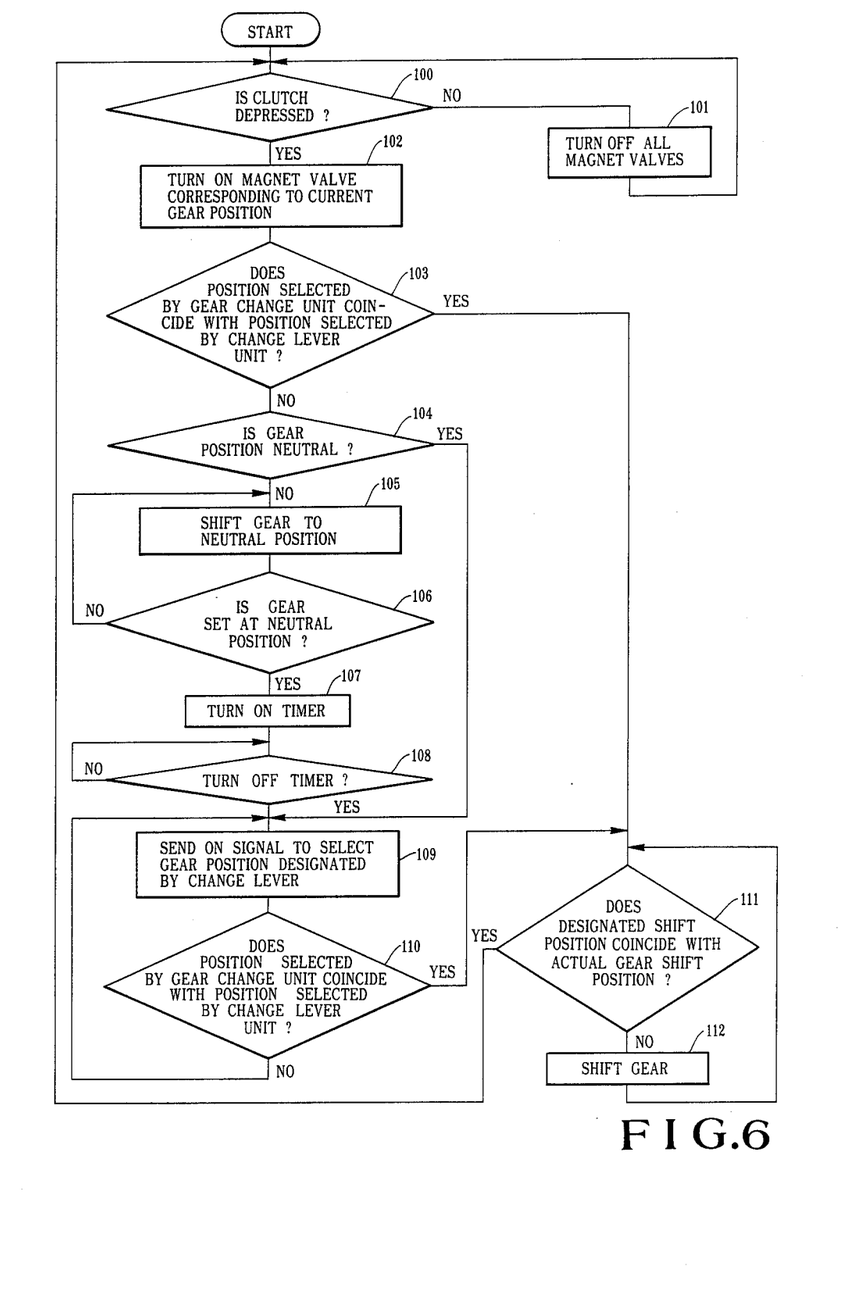
FIG. 6 is a flow chart for explaining the operation of the apparatus of FIG. 4.

FIG. 6 is a flow chart for explaining the remote control operation of the transmission having the structure of FIG. 5. Referring to FIG. 6, the control unit 40 checks in step 100 whether or not the clutch 20 is depressed. If NO in step 100, the flow advances to step 101. In step 101, all magnet valves are turned off, and the flow returns to step 100. When the clutch 20 is actually depressed, i.e., if YES in step 100, the flow advances to step 102, and the magnet valve corresponding to the current gear position represented by the gear shift unit 10 is turned on. The gear position is set in the current gear position to guarantee the operation. The shift and select states of the gear will not be updated.

The control unit 40 then checks in step 103 whether or not the select position in the gear change unit 10 coincides with that of the lever changing unit 30. When the driver moves the change lever 30a in the select direction, the select position of the striker is different from the select position instructed by the lever changing unit 30, and, accordingly, step 103 is determined to be "NO" and the control unit 40 determines in step 104 whether or not the stroker is set at a neutral position. If the resolution of step 103 is YES, the flow then proceeds to step 111 because a problem due to inertia has occurred and the designated shift position coincides with the actual gear shift position. However, if YES in step 104, the flow jumps to step 109, and "gear selection" is performed. This jump is performed because no inertia is produced in the neutral position and the operations is steps 105 to 109 can be omitted. However, if NO in step 104, the flow advances to step 105, and a neutral position shift signal for shifting the gear to the neutral position is supplied to the magnet valves 15a and 15b. The control unit 40 checks in step 106 in response to the output signal from the switch 17b whether or not the gear position is set in the neutral position. If NO in step 106, the flow returns to step 105. When the neutral position is set, and thus step 106 is determined to be "YES", the flow advances to step 107. In step 107, the timer preset for a predetermined period of time is started. The control unit 40 waits in step 108 until the predetermined period of time preset in the timer has elapsed. During this period, the next operation is not performed, and the gear is held in the neutral position, so that an inertia generated during shifting can be absorbed. This timer operation is performed such that the delay circuit 42 which has a timer circuit delays by the predetermined period of time the signal supplied from the control circuit 41. When the preset time has elapsed, i.e., step 108 is determined to be "YES", the flow then advances to step 109 and "gear selection" is performed. In step 109, a signal is supplied from the control circuit 41 to turn on one of the magnet valves 15c and 15d so as to set the select position designated by the change lever 30a.

Step 109 is repeated until the select position designated by the change lever 30a coincides with that of the gear select position. If YES in step 108, the flow advances to step 111. In step 111, the shift position designated by the change lever 30a is compared with the gear shift position, so that "gear shift" in step 112 is repeated until step 111 is determined to be YES. In step 112, a signal is supplied from the control circuit 41 to turn on the magnet valve 15a or 15b. When the control unit 40 detects in step 111 that the gear is set in the designated shift position, gear shift and selection are completed, and the flow returns to step 100.

When the control unit 40 determines that the gear select position coincides with the position designated by the lever changing unit 30, i.e. if YES in step 103, the flow jumps to step 111 because, in this case, no accident due to the inertia of the gear described above is expected and shift operations consisting of steps 111 and 112 are performed, and then the flow returns to step 100.

As is apparent from the above description, in a case wherein the present selected gear position is different from the selecting position instructed by the change lever, the striker is stopped in the neutral position to which the striker encounters at first for the predetermined period of time before selection is started, thereby absorbing inertia of the gear.

Figure 7:
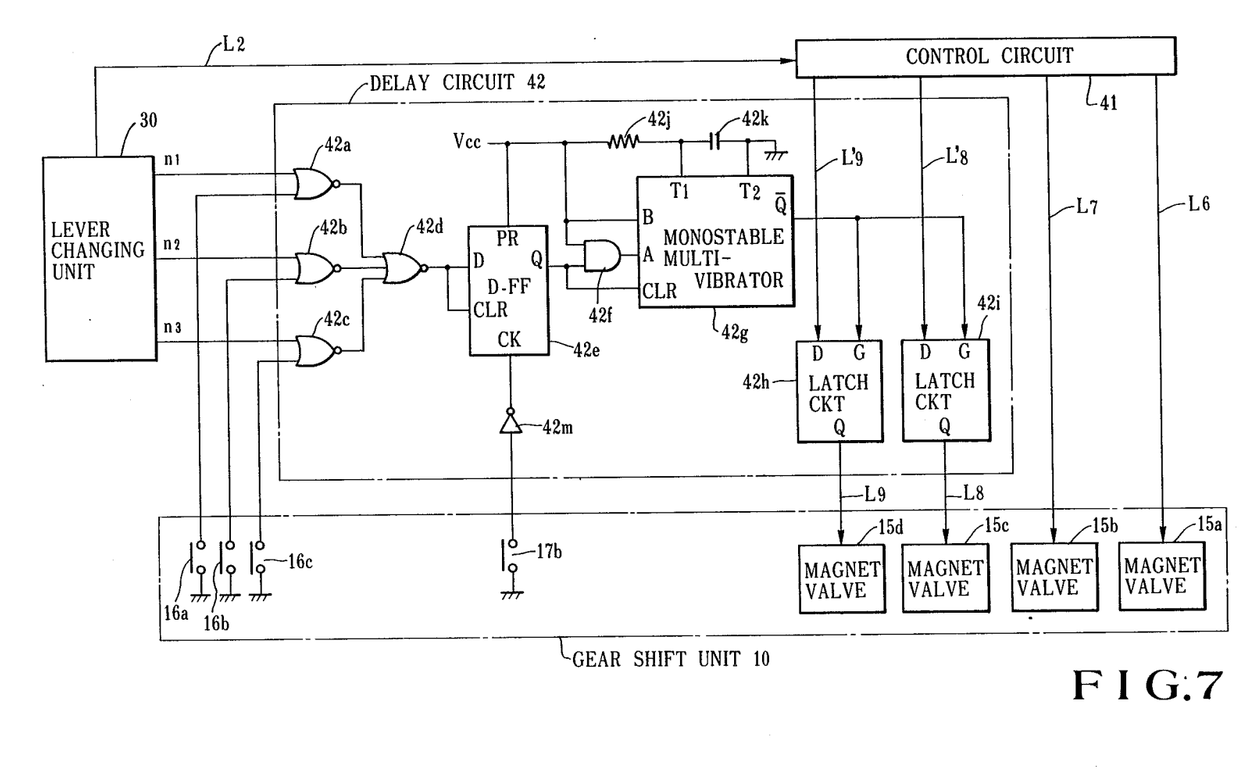
FIG. 7 is a circuit diagram of a delay circuit in the apparatus of FIG. 4.

FIG. 7 is a circuit diagram showing the detailed arrangement of the delay circuit 42 in FIG. 5. Referring to FIG. 7, reference numerals 42a, 42b, 42c and 42d denote NOR gates; 42e, a D flip-flop; 42f, an AND gate; 42g, a monostable multivibrator; 42h and 42i, latch circuits; 42j, a resistor, 42k, a capacitor; and 42m, an inverter. The lever changing unit 30 has three output terminals n1, n2 and n3. When the change lever 30a is set along a line for the reverse, N1 and first-speed gear positions (FIG. 5), a signal of level "0" appears at the output terminals n1. When the change lever 30a is set along a line for the second-speed, N2 and third-speed gear positions (FIG. 5), a signal of level "0" appears at the output terminal n2. When the change lever 30a is set along a line for the fourth-speed, N3 and fifth-speed gear positions (FIG. 5), a signal of level "0" appears at the output terminal n3.

Each of the output terminals n1, n2 and n3 of the lever changing unit 30 is connected to one input terminal of a corresponding one of the NOR gates 42a, 42b and 42c. The other input terminal of each of the NOR gates 42a, 42b and 42c is connected to a corresponding one of the switches 16a, 16b and 16c (FIG. 5) of the select unit 12. When the switches 16a, 16b and 16c (FIG. 5) of the select unit 12. When the switches 16a, 16b and 16c are turned on, the other input terminal of each of the NOR gates 42a, 42b and 42c is set at a reference voltage (ground) of level "0".

Outputs from the NOR gates 42a, 42b and 42c are supplied as inputs to the NOR gate 42d. The output terminal of the NOR gate 42d is connected to an input terminal D and a clear terminal CLR of the D flip-flop 42e. A clock terminal CK of the D flip-flop 42e is connected to the switch 17b (corresponding to the neutral position) in the gear shift unit 10 through an inverter 42m. When the gear is set in the neutral position and the switch 17b is turned on, a voltage signal of level "1" is supplied to the terminal CK. An output terminal Q of the D flip-flop 42e is connected to one input terminal of the AND gate 42f and a clear terminal CLR of the monostable multivibrator 42g. The other input terminal of the AND gate 42f is connected to a power supply terminal of the AND gate 42f is connected to a power supply terminal B of the monostable multivibrator 42g and a power supply terminal VCC of level "1". A series circuit of the resistor 42j and the capacitor 42k is connected between the power supply terminal VCC of level "1" and the reference voltage of level "0". A junction between the resistor 42j and the capacitor 42k is connected to a terminal T1 of the monostable multivibrator 42g. A terminal T2 is connected to the reference voltage of level "0". An output terminal $\overline{Q}$ of the monostable multivibrator 42g is connected to the g terminals of the latch circuits 42h and 42i. Input terminals D of the latch circuits 42h and 42i are connected to the control circuit 41 through the lines L9' and L8', and output terminals Q of the latch circuits 42h and 42i are respectively connected to the magnet valves 15d and 15c for controlling the select position. The latch circuits 42h and 42i perform the operation shown in Table 1 below. In Table 1, a cross indicates an indefinite level ("1" or "0"), and Q0 represents an output level immediately before the terminal G is set at logic "0".

TABLE 1

| Terminal D | Terminal G | Terminal Q |
|---|---|---|
| 0 | 1 | 0 |
| 1 | 1 | 1 |
| X | 0 | Q0 |

The mode of operation of the circuit shown in FIG. 7 will be described hereinafter. when the select position of the lever changing unit 30 is different from that of the gear shift unit 10, the both input terminals of the NOR gates 42a, 42b and 42c are not simultaneously set at logic "0", and outputs therefrom are set at level "0". In this case, the NOR gate 42d generates a signal of level "1". When the switch 17b corresponding to the neutral position in the gear shift unit 10 is turned off, the control circuit 41 generates a signal to drive the magnet valves 15a and 15b. The gear shift unit 10 performs shifting to the neutral position. As a result, the switch 17b is turned on. The clock terminal CK of the D flip-flop 42e goes from level "0" to level "1". The input signal of level "1" is received at the input terminal D and appears at the output terminal Q. when the flip-flop 42e generates a signal of level "1", the monostable multivibrator 42g generates a signal of level "0" for a predetermined period of time determined by the resistor 42j and the capacitor 42k. This signal of level "0" is supplied to the terminals G of the latch circuits 42h and 42i. Meanwhile, in each of the latch circuits 42h and 42i even if the signal for driving the magnet valves 15c and 15d to perform selection is supplied from the control circuit 41 to the terminal D, the signal received at the terminal D is not sent out of the terminal Q unless the terminal G is set at level "1", as shown in Table 1. The output signals from the latch circuits 42h and 42i will not change while the monostable multivibrator 42g is being operated. Therefore, the magnet valves 15c and 15d in the gear shift unit 10 will not be operated and gear selection is disabled.

When the predetermined operation period of the monostable multivibrator 42g has elapsed, the signal of level "1" is supplied to the terminals G of the latch circuits 42h and 42i. The latch circuits 42h and 42i supply to the magnet valves 15d and 15c respectively, the signals received at the input terminals D thereof. As a result, gear select operation is performed.

For the delay time corresponding to the operation time of the monostable multivibrator 42g, the gear shift unit 10 is held in the neutral state by the magnet valves 15a and 15b, the inertia of the transmission 11 can be absorbed, and overshooting of the gear shown in FIG. 1E with respect to the neutral position can be prevented.

The above embodiment is exemplified by the system for remote controlling the gear shift unit. However, the present invention can also be applied to an electronically controlled transmission using an automatic clutch.

According to the present invention described above, in a case wherein the present selected position of the gear is different from the selecting position instructed by the change lever, the neutral state is held for a predetermined period of time when the gear shift unit has reached the neutral position, from the shift position.

The inertia of the gear upon shifting can thereby be absorbed, and the interlock plate can be omitted, thereby decreasing the number of constituting members and the number of manufacturing steps and hence decreasing the cost.

What is claimed is:

1. A remote control apparatus for a transmission which has a selection path, a plurality of shift paths disposed parallel to each other and intersecting said selection path, neutral positions each of which is disposed at the intersections of said selection path and each of said plurality of shift paths, a shift position disposed at each end of each of said shift paths, and a striker which changes its position from one to another of said shift positions through at least one of said shift paths and at least one of said neutral positions, comprising:

means for sending a signal representing an operation state of a change lever;

auxillary power means, remote-controlled by said change lever, for changing a gear position of the transmission and sending a signal representing the gear position; and control means for controlling an operation of said auxillary power means in accordance with the change lever operation state signal and gear position signal, said control means being provided with neutral position holding means responsive to a signal indicating that the shift path on which the striker presently exists is different from the shift path instructed by said change lever, for holding for a predetermined period the striker in the neutral position on the current shift path of said striker;

wherein said neutral position holding means comprises signal transmission delay means having: detecting means for detecting that the shift path on which said striker presently exists is different from the shift path instructed according to said change lever operating signal, then detecting that said striker has reached the first neutral position according to the neutral position signal and generating a neutral position detection signal; timer means, started in response to the neutral position detection signal, for generating an output signal when a predetermined period of time has elapsed; and gate means for opening a signal line between said control means and said auxiliary power means in response to an output signal from said timer means.

2. An apparatus according to claim 1, wherein said timer means comprises a monostable multivibrator.

3. A remote control apparatus for a transmission which has a selection path, a plurality of shift paths disposed parallel to each other and intersecting said selection path, a plurality of neutral positions each of which is disposed at the intersections of said selection path and each of said plurality of shift paths, a shift position disposed at each end of each of said shift paths, and a striker which changes its position from one to another of said shift positions through at least one of said shift paths and at least one of said neutral positions, comprising:

means for sending a signal representing an operation state of a change lever;

auxiliary power means, remote-controlled by said change lever, for changing a gear position of the transmission and sending a signal representing the gear position; and control means for controlling an operation of said auxiliary power means in accordance with the change lever operation state signal and gear position signal, said control means being provided with;

neutral position holding means, for holding the striker in said neutral position, said neutral position holding means comprising:

signal transmission delay means having detecting means for detecting that the current shift path occupied by said striker is different from the shift path instructed according to said change lever operating signal, and detecting when said striker has reached a first neutral position and generating a neutral position detection signal;

timer means for generating an output signal when a predetermined period of time has elapsed; said timer means being actuated in response to said neutral position detection signal; and gate means for opening a signal line between said control means and said auxiliary power means in response to an output signal from said timer means.

4. An apparatus according to claim 3, wherein said timer means comprises a monostable multivibrator.

* * * * *